(12) United States Patent
Tripathi et al.

(10) Patent No.: US 12,352,314 B2
(45) Date of Patent: Jul. 8, 2025

(54) AIR TURBINE STARTER WITH BEARING SUPPORT STRUCTURE

(71) Applicant: Unison Industries, LLC, Jacksonville, FL (US)

(72) Inventors: Pallavi Tripathi, Bengaluru (IN); Subrata Nayak, Bengaluru (IN); Ramana Reddy Kollam, Bengaluru (IN); Sharad Pundlik Patil, Bengaluru (IN); Milind Chandrakant Dhabade, Bengaluru (IN); Narendra Dev Mahadevaiah, Bengaluru (IN); Ravindra Shankar Ganiger, Bengaluru (IN)

(73) Assignee: Unison Industries, LLC, Jacksonville, FL (US)

( * ) Notice: Subject to any disclaimer, the term of this patent is extended or adjusted under 35 U.S.C. 154(b) by 68 days.

(21) Appl. No.: 18/086,100

(22) Filed: Dec. 21, 2022

(65) Prior Publication Data

US 2024/0052890 A1 Feb. 15, 2024

(30) Foreign Application Priority Data

Aug. 12, 2022 (IN) .............................. 202211046088

(51) Int. Cl.
*F16C 35/06* (2006.01)
*F01D 25/24* (2006.01)
*F16C 19/18* (2006.01)

(52) U.S. Cl.
CPC .............. *F16C 35/06* (2013.01); *F01D 25/24* (2013.01); *F16C 19/18* (2013.01); *F05D 2260/85* (2013.01); *F16C 2360/23* (2013.01)

(58) Field of Classification Search
CPC ...... F16C 35/06; F16C 19/18; F16C 2360/23; F16C 27/066; F16C 35/077; F01D 25/24; F01D 25/162; F01D 25/164; F05D 2260/85
See application file for complete search history.

(56) References Cited

U.S. PATENT DOCUMENTS

| 6,696,235 | B2 | 2/2004 | Miki |
| 7,384,199 | B2 | 6/2008 | Allmon et al. |
| 8,727,632 | B2 * | 5/2014 | Do ..................... F16C 33/4623 384/534 |
| 9,869,205 | B2 | 1/2018 | Ganiger et al. |

(Continued)

FOREIGN PATENT DOCUMENTS

| EP | 3715651 A1 | 9/2020 |
| GB | 927207 | 5/1963 |

(Continued)

*Primary Examiner* — James Pilkington
*Assistant Examiner* — Aimee Tran Nguyen
(74) *Attorney, Agent, or Firm* — McGarry Bair PC

(57) ABSTRACT

An air turbine starter (ATS) for starting an engine, having a stator including a housing having an inlet, an outlet, and a flow path extending between the inlet and the outlet and a rotor including a turbine member defining a rotating axis and having a set of blades at least partially disposed within the flow path. The ATS further including a bearing support structure disposed between the rotor and the stator comprising a first bearing support having a first stiffness (K1) and a second bearing support having a second stiffness (K2).

20 Claims, 7 Drawing Sheets

(56) References Cited

U.S. PATENT DOCUMENTS

| | | | |
|---|---|---|---|
| 10,001,028 B2 * | 6/2018 | Ganiger | F01D 25/16 |
| 10,316,756 B2 | 6/2019 | Gentile et al. | |
| 10,519,866 B2 | 12/2019 | Nayak | |
| 10,794,222 B1 * | 10/2020 | Ganiger | F16C 27/04 |
| 11,203,980 B2 | 12/2021 | Varote et al. | |
| 2010/0027930 A1 | 2/2010 | Kinnaird et al. | |
| 2015/0267745 A1 * | 9/2015 | Gallimore | F16C 19/54 |
| | | | 384/101 |
| 2017/0234157 A1 * | 8/2017 | Khan | F16C 27/04 |
| | | | 415/229 |
| 2020/0362727 A1 | 11/2020 | Schwengler | |
| 2021/0189962 A1 | 6/2021 | Gaskell | |
| 2022/0056813 A1 | 2/2022 | Kurvinkop et al. | |

FOREIGN PATENT DOCUMENTS

| | | |
|---|---|---|
| JP | 2020159434 A | 10/2020 |
| KR | 102255948 B1 | 5/2021 |

* cited by examiner

AIR TURBINE STARTER WITH BEARING SUPPORT STRUCTURE

CROSS-REFERENCE TO RELATED APPLICATION(S)

This application claims priority to and the benefit of Indian Provisional Patent Application No. 202211046088, filed Aug. 12, 2022, the entirety of which is incorporated herein by reference.

TECHNICAL FIELD

The present subject matter relates generally to an air turbine starter, and more specifically to a bearing support structure in the air turbine starter.

BACKGROUND

An aircraft engine, for example a gas turbine engine, is engaged in regular operation to an air turbine starter. The internal components of the air turbine starter require bearings. Turbine bearings transfer radial and axial loads during rotor operation. Bearings are typically sized and designed based on load input from rotor dynamics and axial thrust. Bearings typically experience high radial loads due to rigid mounting support bearings.

DETAILED DESCRIPTION

Figure 1:
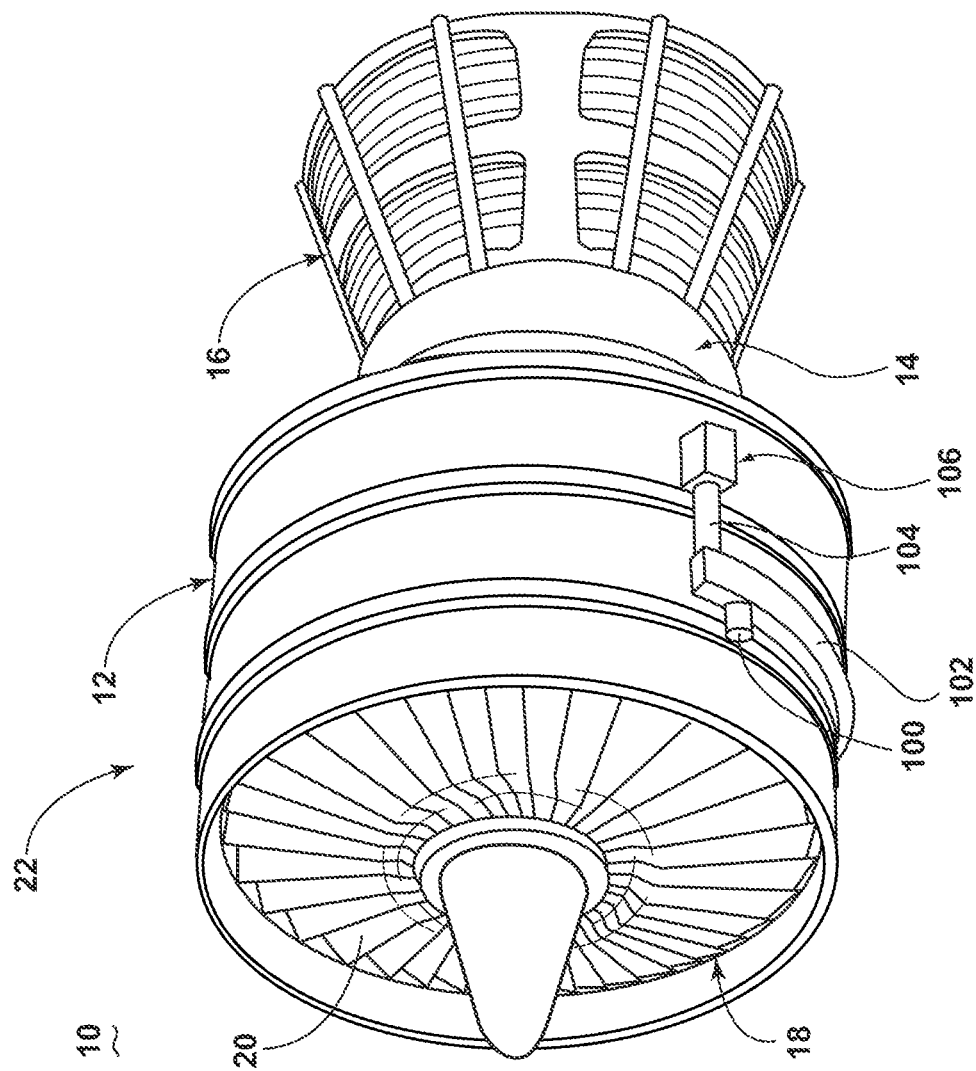
FIG. 1 is a schematic illustration of a gas turbine engine with an air turbine starter in accordance with various aspects described herein.

The present disclosure is related to a bearing support structure for an air turbine starter. An air turbine starter (denoted "ATS") includes a turbine shaft supported by turbine bearings mounted on a turbine exhaust housing. The bearing support structure disclosed herein enables flexibility resulting in lesser bearing loads, in turn elongating the life of the bearings and the bearing support structure, where lubrication, in some cases oil, is shared between the two. The ATS can have various applications including starting a gas turbine engine and generating electrical power when the gas turbine engine is in operation. While the exemplary embodiment described herein is directed to a bearing support structure for an ATS, embodiments of the disclosure can be applied to any implementation of support bearings for engine components.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" may be used herein to refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" may be used herein to refer to a direction that is opposite the lubricant flow direction, and the term "downstream" refers to a direction that is in the same direction as the lubricant flow. The term "fore" or "forward" means in front of something and "aft" or "rearward" means behind something. For example, when used in terms of lubricant flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, may be used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or circuits. In at least some instances, the approximating language may correspond to the precision of an instrument for measuring the value, or the precision of the methods or machines for constructing or manufacturing the components and/or circuits. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate," as used herein, is not limiting, but is rather a descriptor for locating parts described herein. Further, the term "proximate" means nearer or closer to the part recited than the following part. For example, a first hole proximate a wall, the first hole located upstream from a second hole means that the first hole is closer to the wall than the second hole is to the wall.

A typical ATS has convention turbine bearings with bearing sleeves that mounted to a turbine housing via an interference fit to support turbine rotors. Turbine bearings transfer radial and axial loads during operation. Bearings are sized and designed to accommodate the rotor dynamics and axial thrust loads produced during operation. Due to the rigid mounting, bearings experience high radial loads at critical modes, which in turn influences the bearing life.

To enhance the bearing life, a soft-mount bearing arrangement incorporating flexibility in a bearing load path is described herein. The soft-mount bearing arrangement results in lesser radial loads by shifting the critical mode to a lower speed, or revolutions per minute (RPM), for the rotor. The soft-mount bearing arrangement described in more detail herein enables flexibility in the bearing load path by utilizing low stiffness structure between the bearings through implementing flexible connectors. While the axial load does not change, the flexible connectors provide a shift of the critical mode beyond current operating ranges. In other words, the natural frequency or critical mode shifts to a lower frequency in a non-operating range which in turn reduces the load on the bearings.

Referring to FIG. 1, a gas turbine engine 10 having a compressor section 12, a combustion section 14, and a turbine section 16 is illustrated. An air intake 18 defined by a fan 20 supplies air to the compressor section 12 of the engine 10. The air intake 18 and the compressor section 12, collectively known as the 'cold section' 22 of the gas turbine engine 10, are located upstream from the combustion section 14. The compressor section 12 provides the combustion section 14 with high-pressure air. The high-pressure air is mixed with fuel and combusted in a combustion chamber (not shown) in the combustion section 14 to form hot and pressurized combusted gasses. The hot and pressurized combusted gasses pass through the turbine section 16 before exhausting from the gas turbine engine 10. As the pressurized gasses pass through a high-pressure turbine (not shown) and a low-pressure turbine (not shown) of the turbine section 16, the turbines extract rotational energy from the flow of the gases passing through the gas turbine engine 10. The compressor section 12 and the turbine section 16 can be coupled to each other by way of a shaft to power the compressor section 12. The low-pressure turbine can be coupled to the fan 20 of the air intake 18 by way of a shaft to power the fan 20.

The gas turbine engine 10 can be a turbofan engine commonly used in modern commercial and military aviation or it could be a variety of other known gas turbine engines such as a turboprop or turboshaft. The gas turbine engine 10 can also have an afterburner that burns an additional amount of fuel downstream from the turbine section 16 to increase the velocity of the exhausted gases, and thereby increasing thrust.

A starter motor or an air turbine starter (ATS) 100 can be drivingly coupled to the gas turbine engine via an accessory gear box (AGB) 102, also known as a transmission housing, schematically illustrated as being mounted to the gas turbine engine 10. A horizontal drive shaft 104 can extend from the AGB 102 to a transfer gearbox 106. The AGB 102 can be coupled to a turbine shaft within the gas turbine engine 10, either to the low-pressure or high-pressure turbine by way of a radial drive shaft (not shown) extending from the transfer gearbox 106 into the gas turbine engine 10.

Figure 2:
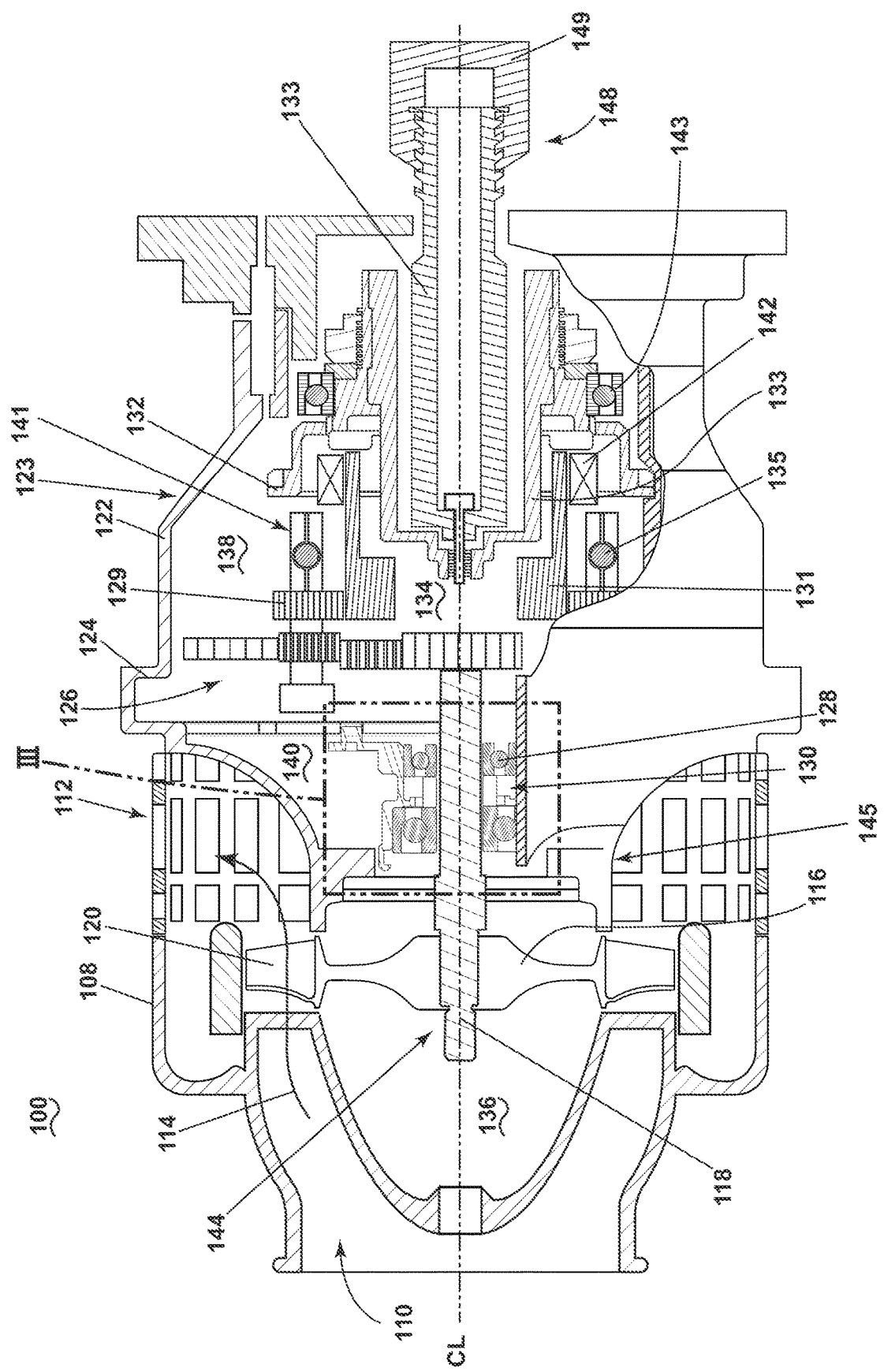
FIG. 2 is a sectional view of the air turbine starter with a bearing support structure according to an aspect described herein.

Referring now to FIG. 2, the ATS 100 is shown in greater detail. The ATS 100 can include a turbine housing 108 defining an inlet 110 and an outlet 112 and a turbine section interior 136. A flow path 114 can extend between the inlet 110 and outlet 112 for communicating a flow of gas from the inlet 110 to the outlet 112. A turbine member 116 can include a turbine shaft 118 and a plurality of blades 120 extending from the turbine shaft 118. The turbine shaft 118 can be journaled within the turbine housing 108 along a centerline (denoted "CL") about which the plurality of blades 120 rotate. The plurality of blades 120 can be disposed within the flow path 114 for rotatably extracting mechanical power from the flow of gas along the flow path 114.

A drive housing 122 can define a drive section 123 with at least a portion of a gear box 124 defining a drive section interior 138. A gear train 126 can be disposed within the gear box 124 and be drivingly coupled with the turbine shaft 118. The gear train 126 can include a ring gear 129 and can further comprise any gear assembly including for example but not limited to a planetary gear assembly or a pinion gear assembly. The turbine shaft 118 can be rotatably mounted to the gear train 126 allowing for the transfer of mechanical power from the turbine member 116 to the gear train 126. The turbine shaft 118 can be supported by a set of turbine bearings 128 disposed in a bearing support structure 130.

A carrier member 131 can be drivingly coupled with the gear train 126. A driven member 132 can include a drive shaft 133 and be rotatably mounted to the carrier member 131. An aperture 134 in the carrier member 131 can receive the drive shaft 133. The carrier member 131 can be supported by carrier bearings 135.

The turbine section interior 136 and the drive section interior 138 together define a housing interior 140. The housing interior 140 can contain lubricant, by way of non-limiting example oil, to provide lubrication and cooling to at least one lubricated component 141, i.e. mechanical parts contained within such as the gear train 126, ring gear 129, and bearings 128, 135.

A clutch 142 can be mounted to the carrier member 131. The driven member 132 is coupled to the clutch 142 and additionally supported by drive bearings 143. The driven member 132 is driven by the carrier member 131 which in turn is driven by the gear train 126 which in turn is driven by the turbine member 116. The clutch 142 can be any type of shaft interface portion that forms a rotor 144 comprising the turbine member 116, the carrier member 131 and the driven member 132. The shaft interface portion can be by any known method of coupling including, but not limited to, gears, splines, a clutch mechanism, or combinations thereof. All rotating parts within the ATS (100) define the rotor 144, while non-rotating parts define a stator 145.

A decoupler assembly 148 can be disposed within at least a portion of the driven member 132. An output shaft 149 can be mounted to the drive shaft 133. The output shaft 149 can be operably coupled to the AGB 102 which in turn is operably coupled to the engine 10.

The turbine housing 108 and the drive housing 122 can be formed by any known materials and methods, including, but not limited to, die-casting of high strength and lightweight metals such as aluminum, stainless steel, iron, or titanium. The turbine housing 108 and the drive housing 122 defining the ATS 100 can be formed with a thickness sufficient to provide adequate mechanical rigidity without adding unnecessary weight to the full assembly and, therefore, the aircraft.

The rotor 144 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 118 and drive shaft 133 along with any other shafts defining the rotor 144 can be fixed or vary along the length of the rotor 144. The diameter can vary to accommodate different sizes, as well as rotor to stator spacings.

During operation air is introduced into the inlet 110, travels along the air flow path 114 causing the rotation of the turbine member 116. This rotation enables the passing along of mechanical energy through the rotor 144 to the AGB 102 and in turn to the engine 10 via the transfer gear box 106 (FIG. 1). Upon starting the engine 10, the clutch 142 can disconnect the drive shaft 133 from the carrier member 132. In the event of a backdrive, the ATS 100 should be disconnected from the AGB 102. The decoupler assembly 148 enables a disconnection from the AGB 102.

Figure 3:
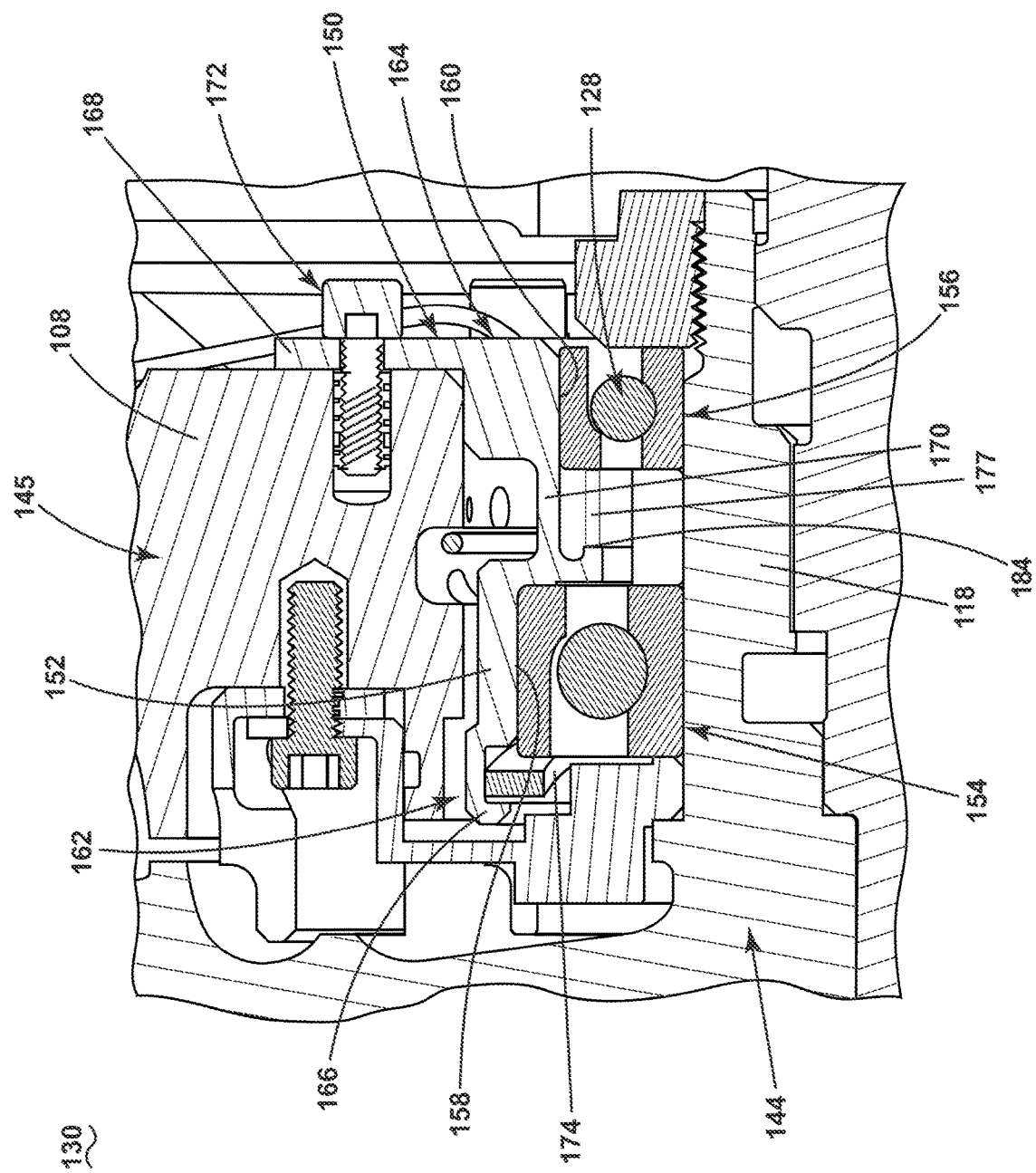
FIG. 3 is an enlarged view of the bearing support structure from FIG. 2 with a spring-finger structure according to an aspect described herein.

FIG. 3 is an enlarged cross-sectional view of section III from FIG. 2 illustrating the bearing support structure 130 with a soft-mount bearing system 150. The soft-mount bearing system 150 can be located anywhere in the ATS 100 between the rotor 144 and the stator 145.

The soft-mount bearing system 150 includes a spring-finger structure 152 disposed between the turbine housing 108 and the turbine shaft 118. The bearing 128 includes a first bearing 154 and a second bearing 156. The bearing 128 can be ball bearings as illustrated, or any type of bearing including cylindrical roller bearings, tapered roller bearings and needle bearings. The first bearing 154 can be larger than the second bearing 156. The first bearing 154 and the second bearing 156 can be in serial arrangement with respect to the centerline CL. The spring-finger structure 152 can include a first bearing support 158 and a second bearing support 160 for accommodating the first bearing 154 and the second bearing 156 respectively.

The spring-finger structure 152 extends axially between a first end 162 and a second end 164. The first end 162 can include a hook 166 and the second end 164 can be defined by a flange 168. The first bearing support 158 can terminate in the hook 166 while the second bearing support 160 can terminate in the flange 168.

A set of flexible connectors 170 can connect the first bearing support 158 to the second bearing support 160. The spring-finger structure 152 can be mounted to the stator 145 with any suitable fastener, including a bolt 172, at the flange 168. The hook 166 can engage a ring 174 circumscribing the rotor 144. A spacer 177, by way of non-limiting example a differential spacer, can be disposed between the first and second bearings 154, 156. In another aspect, a spring 176 (FIG. 6) can be disposed between the first and second bearing 154, 156 proximate the flexible connectors 170 instead of a spacer 177. The spring 176 or spacer 177 each contributing to a flexible movement of the spring-finger structure 152. The set of flexible connectors 170 can be formed from a shape memory alloy (denoted "SMA") material. It is further contemplated that the entire spring-finger structure 152 is formed from an SMA material.

Figure 4:
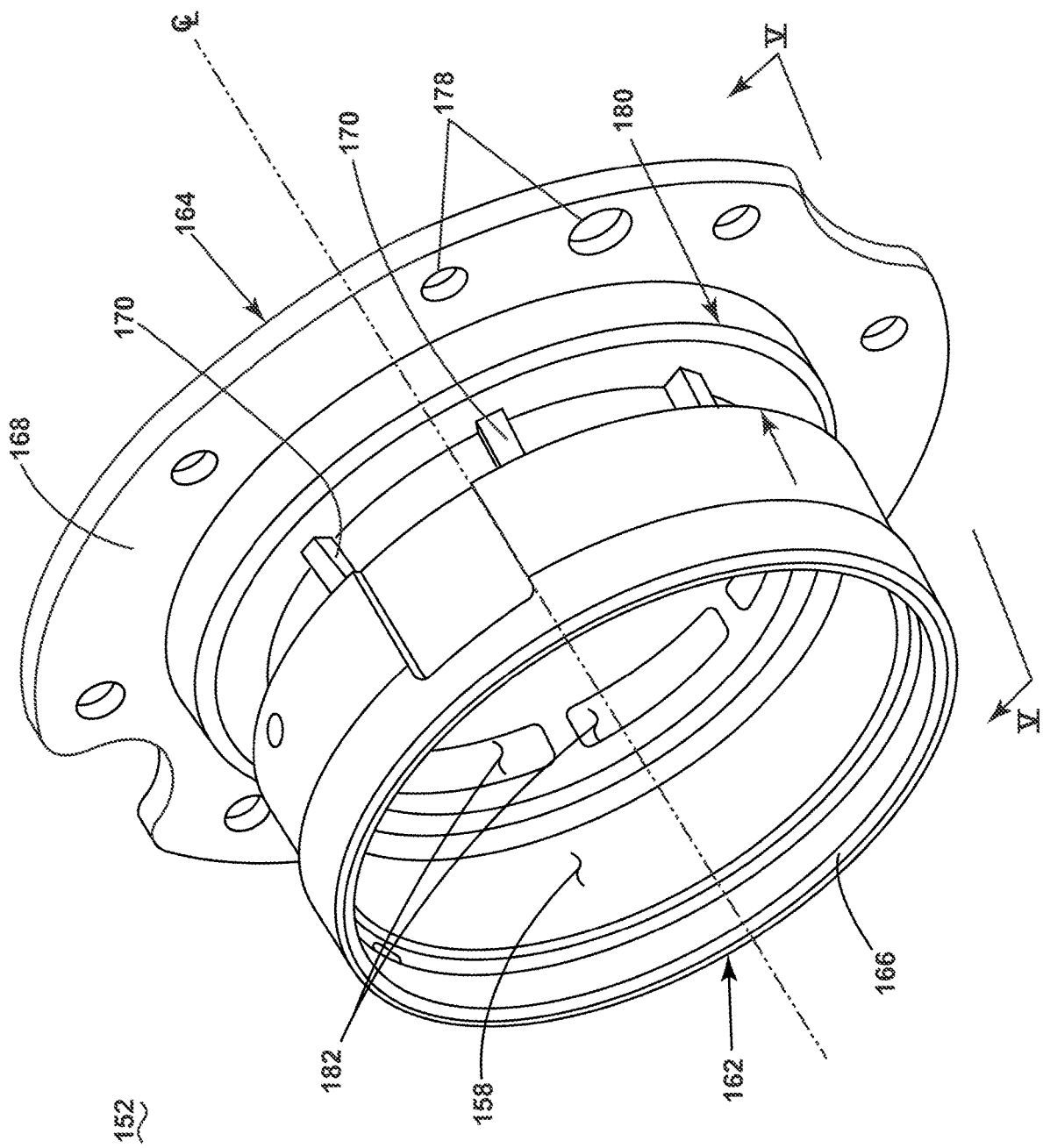
FIG. 4 is a perspective view of the spring-finger structure from FIG. 3.

FIG. 4 is a perspective view of the spring-finger structure 152. The spring-finger structure 152 is an annular structure for circumscribing the rotor 144 about the centerline CL. It can more clearly be seen that the flange 168 can include a set of mount openings 178 through which the bolt 172 (FIG. 3) can extend to fix the spring-finger structure 152 to the stator 145. Further, the set of flexible connectors 170 define an axial space 180 between the first bearing support 158 and the second bearing support 160 (FIG. 3). The set of flexible connectors 170 are circumferentially spaced from each other as well to define a set of annular openings 182 about the centerline CL.

Figure 5:
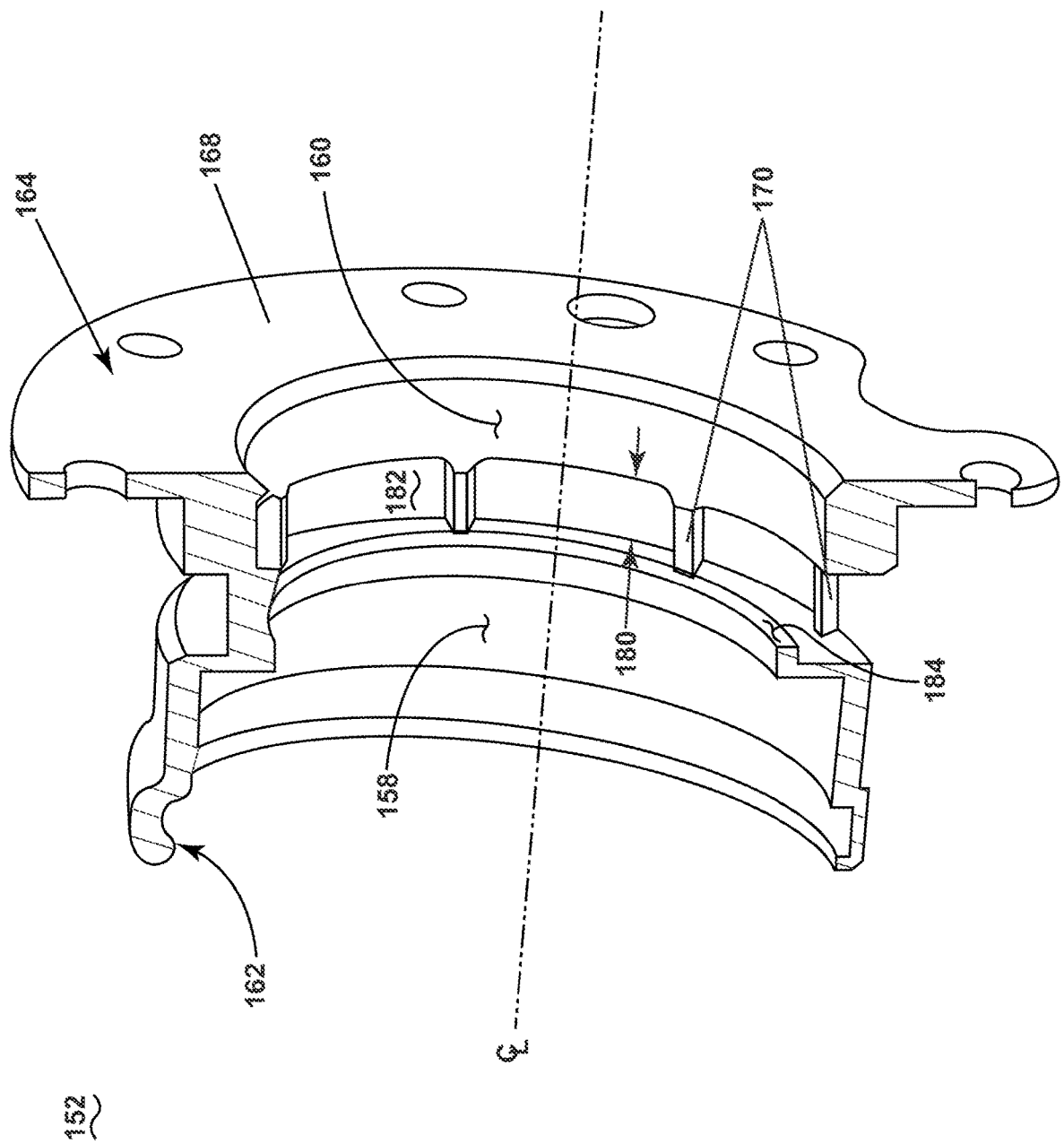
FIG. 5 is a cross-section taken along line V-V of FIG. 4.

Turning to FIG. 5, a cross-section taken along line V-V of FIG. 4 is illustrated. A bearing preload face 184 is located radially inward from the set of flexible connectors 170. The spacer 177 (FIG. 3) can abut the bearing preload face 184 and the second bearing 156 (FIG. 3) when the soft-mount bearing system 150 is assembled. The axial space 180 provides controlled radial deflection for the first bearing support 158 by enabling flexing of the set of flexible connectors 170. In other words, the flexible connectors 170 allow the first bearing support 158 to move in the radial direction and restrict movement of the first bearing support in the axial direction 158.

Figure 6:
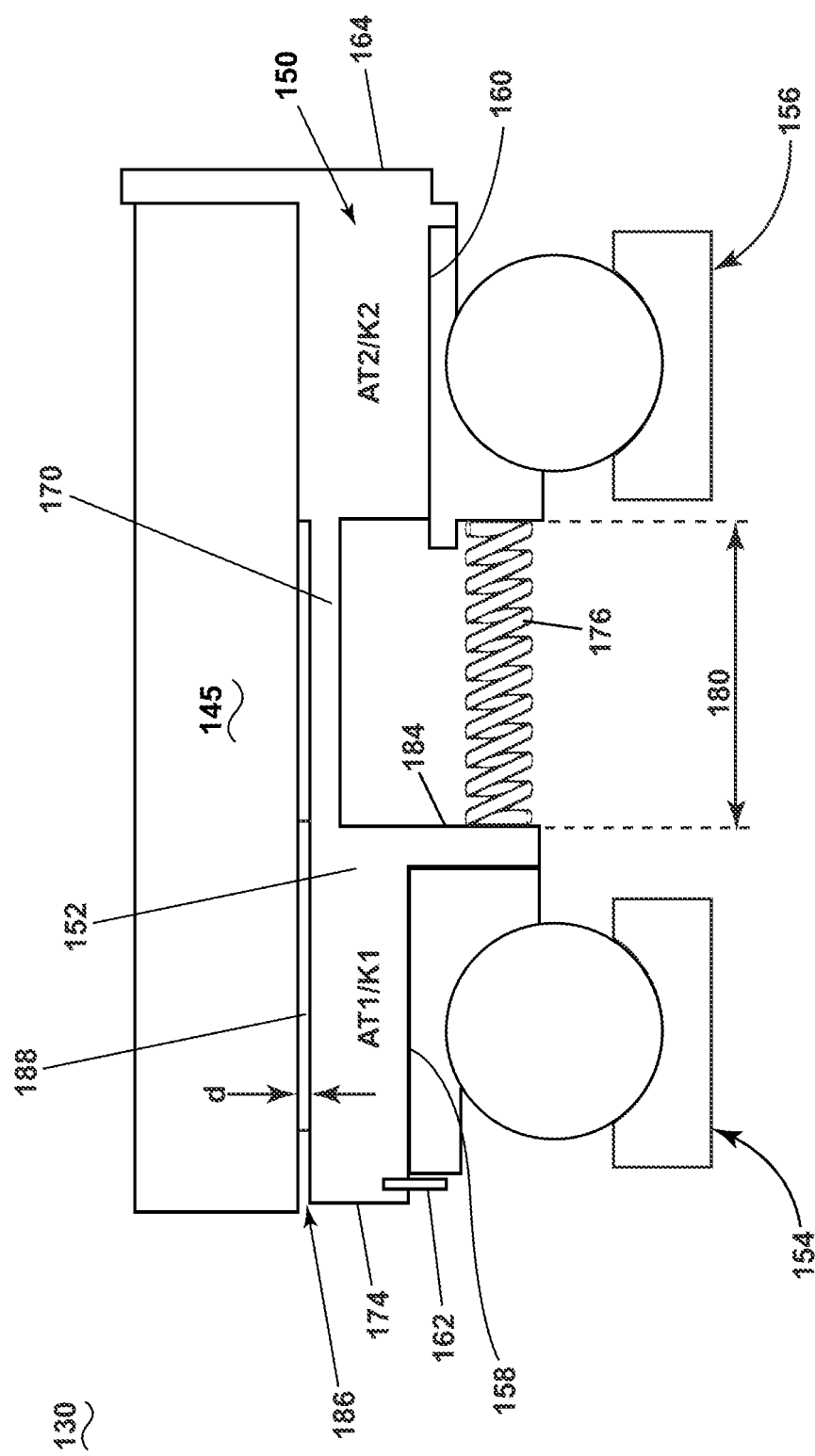
FIG. 6 is a schematic of the bearing support structure from FIG. 3 according to an aspect of the disclosure herein.

FIG. 6 is a schematic of the bearing support structure 130 with the soft-mount bearing system 150 described herein. The first and second bearing supports 158, 160 of the spring-finger structure 152 can be formed to have two different axial/thrust load capabilities (denoted "AT") and two different radial stiffness amounts (denoted "K"). The first bearing support 158 and surrounding structures can be formed to have a first AT value (denoted "AT1") while the second bearing support 160 and surrounding structures can be formed to have a second AT value (denoted "AT2") that is less than the first AT value AT1. Likewise, the first bearing support 158 and surrounding structures can be formed to have a first K value (denoted "K1") while the second bearing support 160 and surrounding structures can be formed to have a second K value (denoted "K2") that is greater than the first K value K1. In other words, the first bearing support 158 has a higher AT and a lower K than the second bearing support 160: AT1>>AT2 and K1<<K2. Therefore, the soft-mount bearing system 150 can define a dual differential thrust rated bearing system where the second bearing 156 can be an "axial bearing" that is moveable in the axial direction while the first bearing 154 can be a "radial bearing" that is moveable in the radial direction. It is further contemplated that the first bearing 154 is an axial bearing and the second bearing 156 is a radial bearing. In other words, the dual differential thrust rated bearing system has one bearing that is axially stiffer and radially softer while the other bearing is axially softer and radially stiffer.

To reduce radial loads on the first bearing 154, the first bearing support 158 has a low K value and is spaced from the stator 145 a distance (denoted "d") defining a displacement gap 186. A squeeze film damper 188 can be disposed in the displacement gap 186. The squeeze film damper 188 is a fluid with viscous properties that act as a damper. The displacement gap 186 reduces any radial loads on the first bearing 154 as the distance "d" and/or the squeeze film damper 188 is closed/squeezed. While the radial loads are reduced, the first bearing support 158 continues to provide support in the axial direction. In the event of a high load condition, the displacement gap 186 completely closes and the radial load is transferred to the stator 145.

To reduce axial loads on the second bearing 156, the spring 176 enables preloading of the spring-finger structure 152 on the second bearing support 160. The second bearing support 160 absorbs any radial loads while the spring finger 170 transfers axial loads to the stator 145 bypassing the second bearing support 160 and the second bearing 156.

Figure 7:
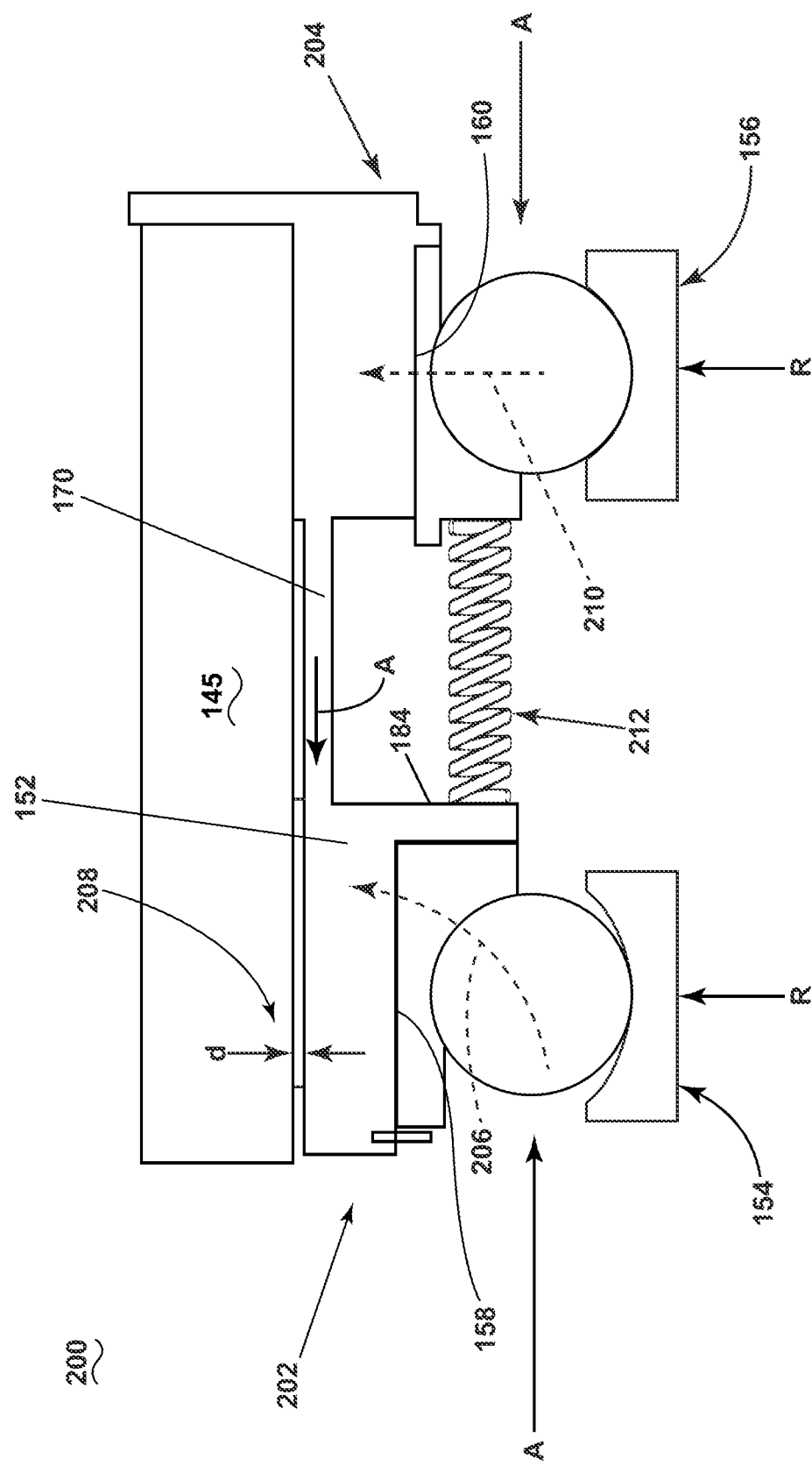
FIG. 7 is the schematic of FIG. 6 illustrating a method of distributing a load with the bearing support structure.

Turning to FIG. 7, a method 200 of distributing a load with the spring-finger structure 152 can include at 202 supporting the first bearing 154 with the first bearing support 158 and at 204 supporting the second bearing 156 with the second bearing support 160.

At 206 absorbing an axial load (denoted "A") with the first bearing support 158. The first bearing support 158 deflecting at 208 up to the distance d from a radial load (denoted "R") to reduce the radial load R on the first bearing 154.

At 210 absorbing the radial load R with the second bearing support 160. Any axial loads in the spring 176 are due only to preloading the spring. At 212 the axial load A is transferred to the stator 145 via the set of flexible connectors 170 bypassing the second bearings support and the second bearing 156.

Benefits associated with the spring-finger structure 152 described herein include less loads on the bearings. Less loads equate with better lubrication which allow for more robust operations. Adding stiffness to the bearing load path moved the rotor critical mode to a lower speed, by way of non-limiting example 39000 RPM, which in turn reduced the radial loads & axial load on the bearings which resulted into higher bearing life.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or circuits and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An air turbine starter for starting an engine, comprising a stator including a housing having an inlet, an outlet, and a flow path extending between the inlet and the outlet; a rotor including a turbine member defining a rotating axis and having a set of blades at least partially disposed within the flow path; a bearing support structure disposed between the rotor and the stator comprising a first bearing support having a first stiffness ($K1$) and a second bearing support having a second stiffness ($K2$) different than the first stiffness ($K1$).

The air turbine starter of any preceding clause, further comprising a set of flexible connectors extending between and connecting the first bearing support to the second bearing support to define a spring-finger structure.

The air turbine starter of any preceding clause wherein the set of flexible connectors define a load path between the first bearing support and the second bearing support.

The air turbine starter of any preceding clause, further comprising a first bearing carried by the first bearing support and a second bearing axially spaced from the first bearing and carried by the second bearing support.

The air turbine starter of any preceding clause wherein the first bearing and the second bearing are in a serial arrangement with respect to the rotating axis.

The air turbine starter of any preceding clause, further comprising a spring or spacer extending between a portion of the bearing support structure and the second bearing for preloading the set of flexible connectors.

The air turbine starter of any preceding clause wherein the first or second bearing is a radial bearing and the second or first bearing is an axial bearing.

The air turbine starter of any preceding clause wherein the bearing support structure comprises a flange for mounting the bearing support structure to the stator.

The air turbine starter of any preceding clause wherein the set of flexible connectors define an axial space between the first bearing support and the second bearing support.

The air turbine starter of any preceding clause wherein the set of flexible connectors influence a first axial/thrust load capability ($AT1$) for the first bearing support different than a second axial/thrust load capability ($AT2$) of the second bearing support.

The air turbine starter of any preceding clause wherein the stator is spaced from the bearing support structure proximate the first bearing support a distance (d) to define a displacement gap wherein the displacement gap influences the first stiffness ($K1$).

The air turbine starter of any preceding clause wherein the bearing support structure defines a dual differential thrust rated bearing system where $K1 \ll K2$ and $AT1 \gg AT2$.

The air turbine starter of any preceding clause further comprising a squeeze film damper located in the displacement gap.

The air turbine starter of any preceding clause wherein the set of flexible connectors are formed from a shape memory alloy material.

The air turbine starter of any preceding clause wherein the bearing support structure is formed from a shape memory alloy material.

A bearing support structure comprising a first bearing support having a first stiffness ($K1$); a second bearing support having a second stiffness ($K2$) greater than the first stiffness ($K1$); a set of flexible connectors extending between and connecting the first bearing support to the second bearing support.

The bearing support structure of any preceding clause wherein the set of flexible connectors define a load path between the first bearing support and the second bearing support.

The air turbine starter of any preceding clause wherein the set of flexible connectors define an axial space between the first bearing support and the second bearing support.

The air turbine starter of any preceding clause wherein the set of flexible connectors influence a first axial/thrust load capability (AT1) for the first bearing support different than a second axial/thrust load capability (AT2) of the second bearing support.

The air turbine starter of any preceding clause wherein the stator is spaced from the bearing support structure proximate the first bearing support a distance (d) to define a displacement gap wherein the displacement gap influences the first stiffness (K1) and the bearing support structure defines a dual differential thrust rated bearing system where K1<<K2 and AT1>>AT2.

What is claimed is:

1. An air turbine starter for starting an engine, comprising:
    a stator including a housing having an inlet, an outlet, and a flow path extending between the inlet and the outlet;
    a rotor including a turbine member defining a rotating axis and having a set of blades at least partially disposed within the flow path;
    a bearing support structure disposed between the rotor and the stator comprising a first bearing support having a first radial stiffness (K1) and a second bearing support having a second radial stiffness (K2) different than the first radial stiffness (K1), the first bearing support being located axially forward of the second bearing support and axially closer to the inlet than the second bearing support, with respect to the rotating axis and the housing;
    a first bearing carried by the first bearing support;
    a second bearing carried by the second bearing support;
    a spring or spacer extending between a portion of the bearing support structure and the second bearing; and
    a set of flexible connectors elongated in an axial direction and extending from the first bearing support and to the second bearing support to define a spring-finger structure.

2. The air turbine starter of claim 1, wherein the first radial stiffness is at least partially defined by the set of flexible connectors.

3. The air turbine starter of claim 2, wherein the set of flexible connectors define a load path between the first bearing support and the second bearing support.

4. The air turbine starter of claim 3, wherein the second bearing is axially spaced from the first bearing.

5. The air turbine starter of claim 4, wherein the first bearing and the second bearing are in a serial arrangement with respect to the rotating axis.

6. The air turbine starter of claim 2, wherein the set of flexible connectors define an axial space between the first bearing support and the second bearing support.

7. The air turbine starter of claim 6, further comprising: a first bearing carried by the first bearing support and a second bearing axially spaced from the first bearing and carried by the second bearing support; and
    wherein at least one of the first bearing or the second bearing is axially moveable with respect to the rotating axis, wherein an axial movement of the first bearing partially defines a first axial/thrust load capability (AT1) for the first bearing support, wherein the first axial/thrust load capability (AT1) is different than a second axial/thrust load capability (AT2) of the second bearing support.

8. The air turbine starter of claim 7 wherein the first bearing support is spaced from the stator by a distance (d) to define a displacement gap, wherein the first bearing support can move in a radial direction toward the stator.

9. The air turbine starter of claim 8, wherein the bearing support structure defines a dual differential thrust rated bearing system where K1<K2 and AT1>AT2.

10. The air turbine starter of claim 2, wherein the set of flexible connectors are formed from a shape memory alloy material.

11. The air turbine starter of claim 10, wherein the bearing support structure is formed from a shape memory alloy material.

12. The air turbine starter of claim 1, wherein the bearing support structure comprises a flange for mounting the bearing support structure to the stator.

13. A air turbine starter for starting an engine, comprising:
    a stator including a housing having an inlet, an outlet, and a flow path extending between the inlet and the outlet;
    a rotor including a turbine member defining a rotating axis and having a set of blades at least partially disposed within the flow path;
    a bearing support structure disposed between the rotor and the stator comprising a first bearing support having a first radial stiffness (K1) and a second bearing support having a second radial stiffness (K2) different than the first radial stiffness (K1);
    a set of flexible connectors elongated in an axial direction and extending from the first bearing support and to the second bearing support to define a spring-finger structure, the first radial stiffness at least partially defined by the set of flexible connectors, wherein the set of flexible connectors define a load path between the first bearing support and the second bearing support;
    a first bearing carried by the first bearing support and a second bearing axially spaced from the first bearing and carried by the second bearing support, wherein the first bearing and the second bearing are in a serial arrangement with respect to the rotating axis; and
    a spring or spacer extending between a portion of the bearing support structure and the second bearing for preloading the set of flexible connectors.

14. The air turbine starter of claim 13, wherein at least one of the first bearing or second bearing is gradually moveable with respect to the rotating axis, and at least one of the first bearing or the second bearing is axially moveable with respect to the rotating axis.

15. An air turbine starter for starting an engine, comprising:
    a stator including a housing having an inlet, an outlet, and a flow path extending between the inlet and the outlet;
    a rotor including a turbine member defining a rotating axis and having a set of blades at least partially disposed within the flow path;
    a bearing support structure disposed between the rotor and the stator comprising a first bearing support having a first radial stiffness (K1) and a second bearing support having a second radial stiffness (K2) different than the first radial stiffness (K1), wherein:
        the first bearing support is spaced from the stator by a distance (d) to define a displacement gap;
        the first bearing support can move in a radial direction toward the stator;
        the bearing support structure defines a dual differential thrust rated bearing system where K1<K2 and AT1>AT2;
    a set of flexible connectors elongated in an axial direction and extending between and connecting the first bearing support to the second bearing support to define a spring-finger structure, wherein the first radial stiffness is at least partially defined by the set of flexible connectors, and the set of flexible connectors define an axial space between the first bearing support and the second bearing support;

a first bearing carried by the first bearing support;

a second bearing axially spaced from the first bearing, the second bearing being carried by the second bearing support, wherein at least one of the first bearing or the second bearing is axially moveable with respect rotating axis, wherein an axial movement of the first bearing partially defines a first axial/thrust load capability (AT1) for the first bearing support, wherein the first axial/thrust load capability (AT1) is different than a second axial/thrust load capability (AT2) of the second bearing support; and a squeeze film damper located in the displacement gap.

16. A bearing support structure comprising:

a first bearing support having a first stiffness (K1);

a second bearing support having a second stiffness (K2) greater than the first stiffness (K1);

a set of flexible connectors extending between and connecting the first bearing support to the second bearing support;

a first bearing carried by the first bearing support;

a second bearing axially spaced from the first bearing, the second bearing being carried by the second bearing support; and a spring or spacer extending between a portion of the bearing support structure and the second bearing.

17. The bearing support structure of claim 16, wherein the set of flexible connectors are elongated in a axial direction and define a load path between the first bearing support and the second bearing support.

18. Bearing support structure of claim 16, wherein the set of flexible connectors define an axial space between the first bearing support and the second bearing support.

19. The bearing support structure of claim 18, wherein at least one of the first bearing or the second bearing is axially moveable, wherein an axial movement of the first bearing partially defines a first axial/thrust load capability (AT1) for the first bearing support, wherein the first axial/thrust load capability is different than a second axial/thrust load capability (AT2) of the second bearing support.

20. The bearing support structure of claim 19, wherein the bearing support structure is provide within an air turbine starter having a stator, the first bearing support is spaced from the stator by a distance (d) to define a displacement gap, wherein the displacement gap influences the first stiffness (K1) and the bearing support structure defines a dual differential thrust rated bearing system where K1<K2 and AT1>AT2.

* * * * *